United States Patent [19]

Mickelson

[11] 4,043,652
[45] Aug. 23, 1977

[54] AUTOMATIC MICROFILM HANDLING APPARATUS

[75] Inventor: Micheal J. Mickelson, St. Paul, Minn.

[73] Assignee: Minnesota Mining and Manufacturing Company, St. Paul, Minn.

[21] Appl. No.: 525,402

[22] Filed: Nov. 20, 1974

[51] Int. Cl.² ............................................. G03B 23/12
[52] U.S. Cl. .................................... 353/26 A; 250/557
[58] Field of Search ............... 353/26 A, 25; 250/555, 250/557, 561, 571, 233, 570

[56] References Cited

U.S. PATENT DOCUMENTS

| | | | |
|---|---|---|---|
| 3,299,272 | 1/1967 | Furukawa | 250/561 |
| 3,708,677 | 1/1973 | Volk et al. | 353/26 A |
| 3,744,890 | 7/1973 | Suzuki | 353/26 A |
| 3,751,152 | 8/1973 | Rinehart | 353/26 A |
| 3,778,630 | 12/1973 | White | 353/26 A |
| 3,885,866 | 5/1975 | Stearns | 353/26 A |

*Primary Examiner*—Harry N. Haroian
*Attorney, Agent, or Firm*—Cruzan Alexander; Donald M. Sell; William B. Barte

[57] ABSTRACT

In a microfilm web handling apparatus wherein a photocell senses position markers corresponding to image frames along the microfilm web to enable positioning of a given image frame within a viewing station, a reference photocell provides a reference signal which is compared with a detected signal from the position sensing photocell to produce a position signal which is processed via logic networks to drive a film transport mechanism to thereby selectively position the microfilm web. Preferably, three photocells are provided, two of which sense position markers adjacent one edge of the microfilm web, while the third provides the reference signal. Each photocell has an effective sensing diameter which is not greater than one-half the dimension of a position marker parallel to the direction of travel of the web. In such an embodiment, the output of the reference photocell is compared with the detected signal from each of the two position indicating photocells.

The apparatus further preferably includes a transverse motion carriage to enable image frames located within either of two parallel tracks along the length of the microfilm web to be selectively positioned within a viewing station. The transverse motion carriage and the direction of web transport are automatically controlled in response to appropriate input signals.

8 Claims, 10 Drawing Figures

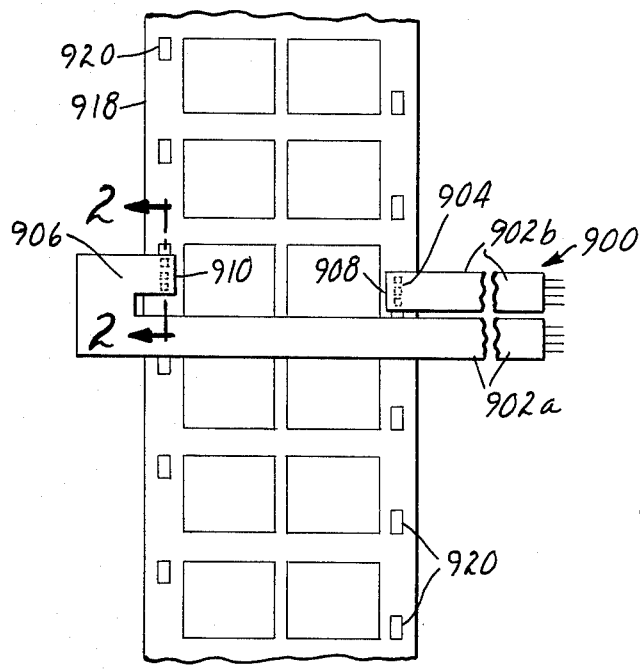
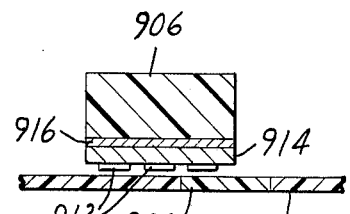
FIG.1
FIG.2
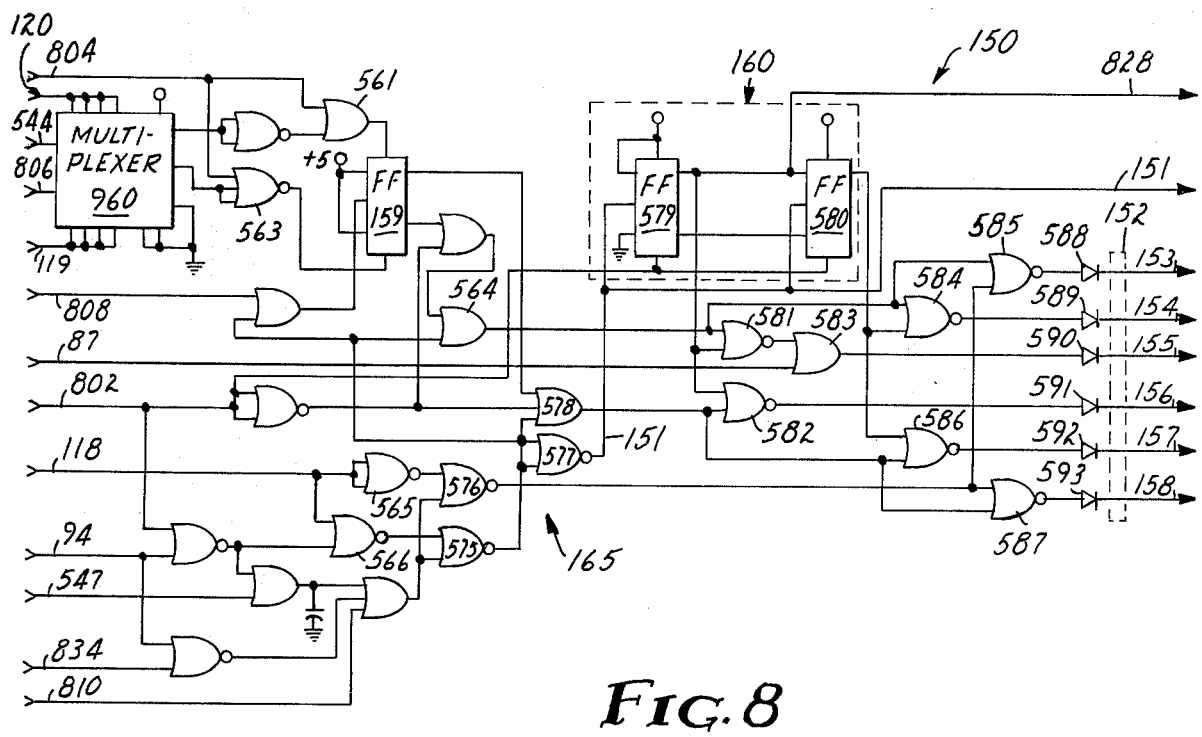
FIG.8

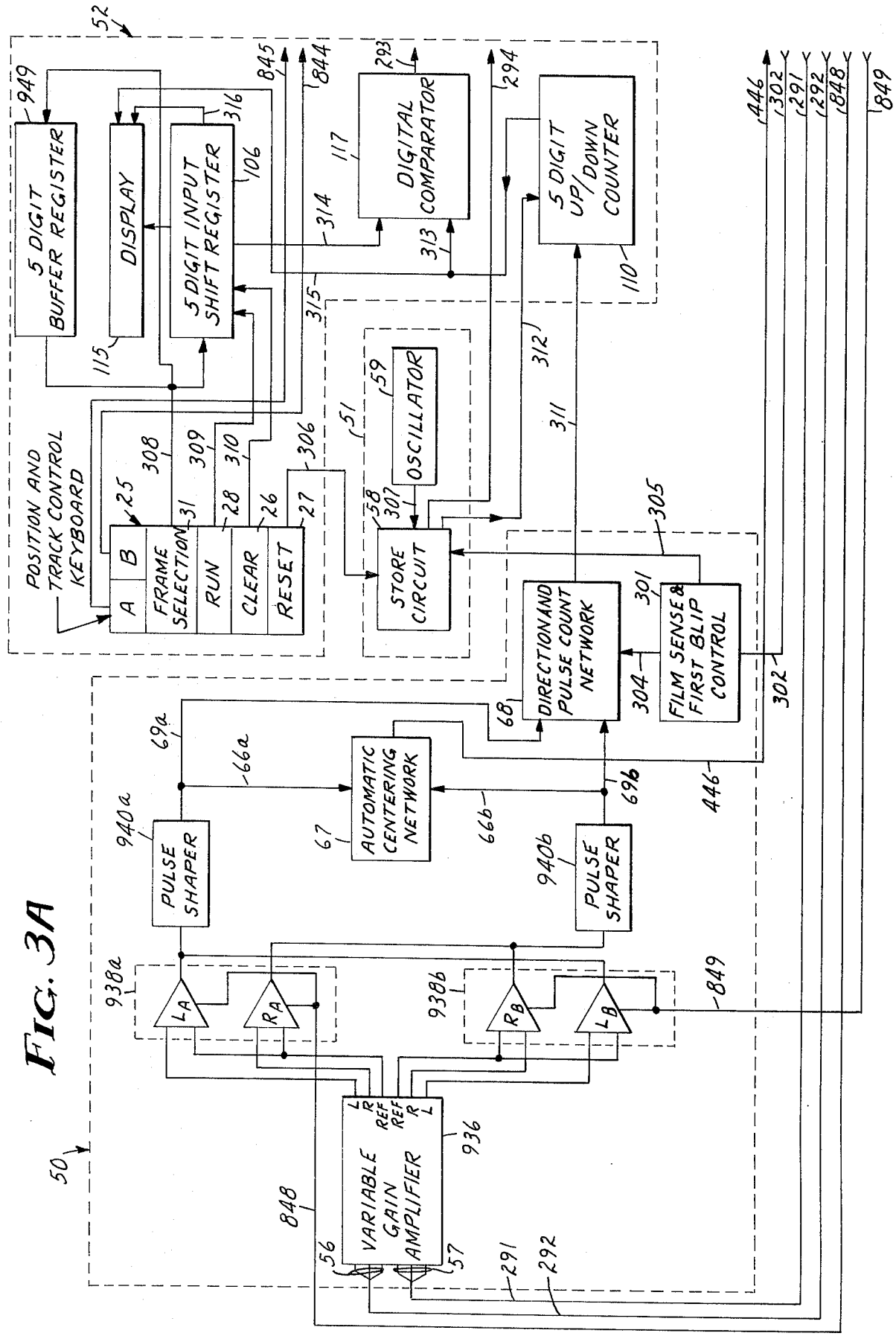

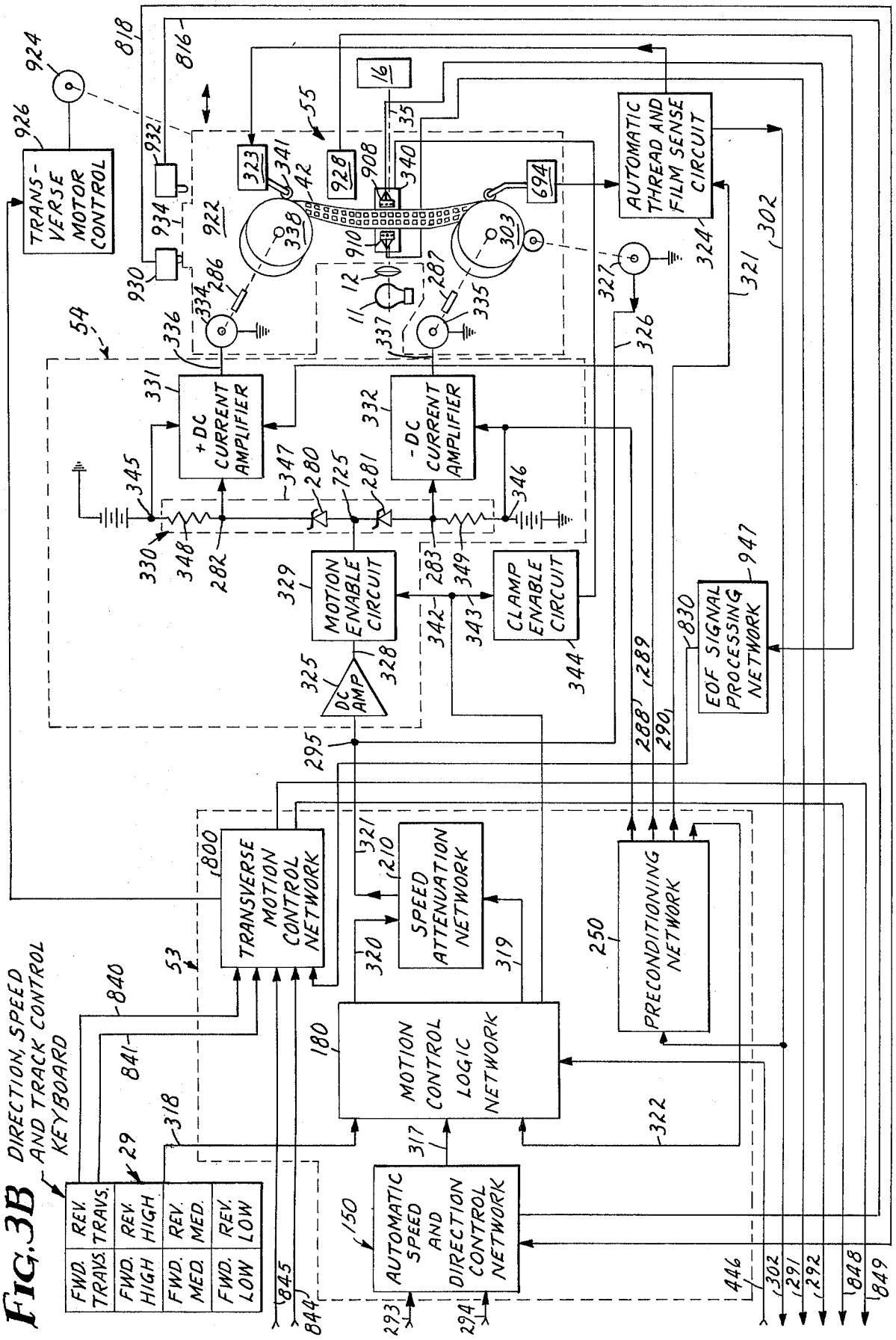

AUTOMATIC MICROFILM HANDLING APPARATUS

BACKGROUND OF THE INVENTION

1. Field of the Invention

This invention relates to an improvement in data processing systems such as a microfilm handling apparatus, wherein optical-mechanical image storage and readout devices automatically locate and position a predetermined image frame of a microfilm web in a viewing station.

2. Description of the Prior Art

The improved microfilm handling apparatus of the present invention has certain features which are common to the prior art. The microfilm is contained on supply and takeup reels which are supported by rotatable supporting members, such as spindles, so that the film web may be transported through a viewing station. The viewing station includes a light source and optical elements defining a focal plane in which the predetermined microfilm image frame is positioned for projection of an image therefrom. The reels are driven in accordance with currents furnished from a power supply system. The power supply system is controlled by an error signal provided by a comparing network. The error signal is produced in response to a comparison of a web motion signal indicative of the actual web transport speed and direction, with a control signal indicative of the desired web transport speed and direction. The web motion signal is provided by a sensing device and the control signal is provided by a control device. The predetermined image frame is located in the viewing station by counting position markers which may be located on one edge of the web and adjacent each image frame, and by providing control signals in accordance with such count. The marker count is provided by light detectors such as photocells positioned within the viewing station adjacent the focal plane.

The typical prior art microfilm handling apparatus having means for controlling microfilm web motion and for locating a predetermined microfilm image frame in a viewing station, as described above, are shown in U.S. Pat. Nos. 3,184,177, 3,290,987, 3,596,253 and 3,802,771 and in German Pat. No. 1,270,597.

In particular, U.S. Pat. No. 3,802,771 discloses a microfilm web handling apparatus using dual photocells which abut each other and which have an effective sensing diameter at the focal plane which is not greater than one-half the dimension of a position marker parallel to the direction of travel of the web. The threshold level at which signals from the dual photocells are sensed to indicate the presence of a position marker is automatically adjusted upon insertion of a microfilm web into the apparatus, thereby compensating for any variations in component tolerances, ambient conditions or variations in the overall optical density of the film. Such an apparatus is not capable of changing the threshold level in response to variations in optical density as may occur along a web or from one edge of a web to another or to variations in the ambient level resulting from line voltage variations and the like. Furthermore, that apparatus is incapable of sensing position markers positioned adjacent image frames arranged in two parallel tracks along the web and of transversely positioning image frames in either track with respect to the viewing station.

SUMMARY OF THE INVENTION

The microfilm handling apparatus of the present invention provides a capability of transporting a microfilm web having two parallel tracks of image frames, one set adjacent each edge of the web, such that an image frame of the microfilm web is positioned in a viewing station. The apparatus includes two sets of light detectors, a first set for optically detecting position markers on the microfilm web corresponding to image frames adjacent one edge of the web and a second set for optically detecting position markers corresponding to image frames adjacent the opposite edge of the web. Position signals are produced when a position marker is positioned over one light detector of one of the sets of light detectors, which signals control a web position regulation network coupled to a driving mechanism to stop the microfilm web to thereby position an image frame in the viewing station for projection of an image from that frame. The apparatus further includes another light detector in each set of detectors for producing a light level reference signal when a position marker is not positioned over that detector. All light detectors are positioned along a line parallel to the direction of travel of the microfilm web. The web position regulation network further comprises a position signal conditioning network coupled to the light detectors for comparing the light level reference signal with a detected signal from the first light detector and for producing a position signal only when the difference between the reference signal and the detected signal exceeds a predetermined value, to thereby automatically adjust the threshold sensitivity level at which a position signal is produced.

The apparatus also includes means for sensing the final image of one of the two parallel tracks at one end of the web and for providing an end-of-web signal thereupon, means for reversing the direction of travel of the web in response to the end-of-web signal and transverse drive means for shifting the microfilm transversely with respect to the transport path in response to an end-of-web signal, whereby image frames of either of the two tracks may be positioned in the viewing station.

Each set of light detectors preferably comprises an array of three light detectors, the center detector in each array abutting the outer detectors, each detector having an effective sensing diameter at the focal plane which is not greater than one-half the dimension of a position marker parallel to the direction of travel of the web. Such a configuration ensures that two separate signals are detected by two abutting light detectors and that a light level reference signal is produced by the third light detector when a position marker is positioned over one of the two abutting light detectors and not over the other. In this embodiment, the web position regulation network further comprises an automatic centering network for comparing the two position signals. When enabled, this network produces an automatic centering signal for stopping the microfilm web when the comparison indicates that a first edge of a position marker is positioned between the two abutting light detectors such that an image frame is centered in the viewing station.

The apparatus preferably further comprises a control network for providing a control signal corresponding to web position and to a desired web transport speed and direction of travel, a sensor for sensing actual web speed and direction and for providing a web motion signal which varies in accordance with web speed and direction of travel, a comparator coupled to the control network and to the web speed and direction sensor for receiving the control signal and the web motion signal, and for providing an error signal indicative of the difference therebetween and a power supply controlled by the error signal and electrically connected to the driving mechanism to produce web motion in accordance with the error signal, whereby the speed and direction of said web is controlled to position an image frame at the viewing station. Preferably, additional keyboards controls are provided to enable manual repositioning of either of the microfilm tracks within the viewing station.

BRIEF DESCRIPTION OF THE DRAWING

FIG. 1 is a fragmentary detail view of the light detectors positioned in cooperation with a section of a microfilm web for detecting position markers on the web;

FIG. 2 is a cross-sectional view of the light detectors and microfilm web of FIG. 1, taken approximately along the section line 2—2;

FIGS. 3A and 3B, appearing on two separate sheets of drawing respectively, together show a schematic diagram, partially in block form, of a preferred embodiment of the microfilm web handling apparatus of the present invention;

FIG. 8 is a schematic diagram of the automatic speed and direction control network shown in FIG. 3B and identified therein by the reference numeral 150.

DESCRIPTION OF THE PREFERRED EMBODIMENTS

Figure 4:
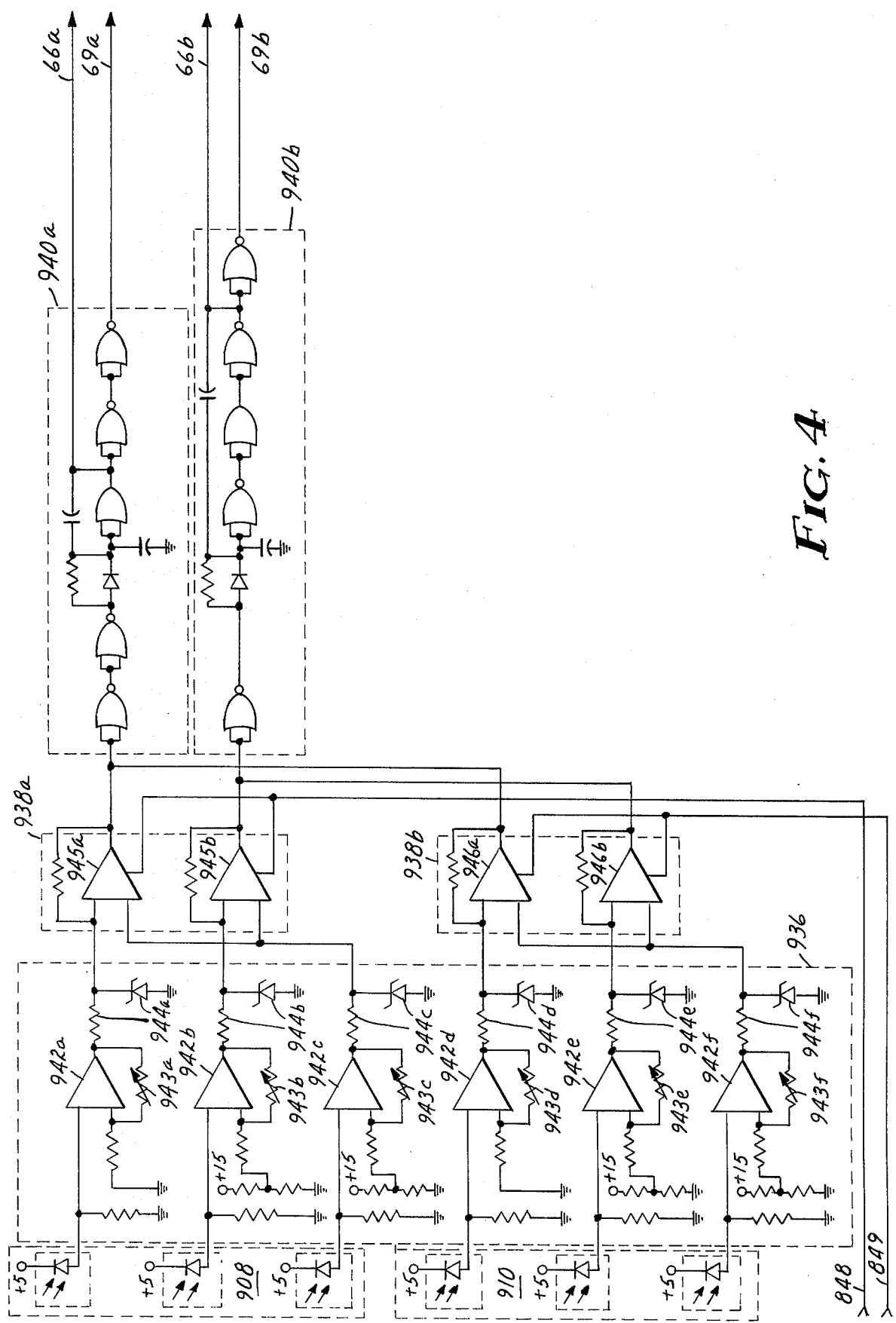
FIGS. 4 and 5 are schematic circuit diagrams of the position signal conditioning network shown in FIG. 3A and identified therein by reference numeral 50.

The present invention incorporates many of the features previously disclosed in detail in U.S. Pat. No. 3,802,771. Accordingly, the entire disclosure thereof is incorporated herein by reference. To facilitate reference to the disclosure in that patent, the same numerals have been used herein to identify the same members, circuits, etc. also shown in that patent. Where members which are an essential part of the entire apparatus of the present invention, but which have not been changed from that disclosed in the cross-referenced patent, such members are not further described herein. Thus members shown in FIGS. 1, 2A, 2B, 10, 11, 12, 13, 14 and 15 of that patent are thus fully incorporated herein.

A side view of a microfilm web reader/printer apparatus incorporating the present invention is shown as FIG. 1 of the cross-referenced patent referred to hereinabove. A control panel such as that shown in FIGS. 2A and 2B of that patent includes a selector switch 22 for enabling an operator to adjust the apparatus in accordance with the type and format of microfilm to be used therein. In addition to providing for manual operation of a direction and speed control network to thus manually position a desired image frame at the viewing station, the switch is preferably provided with additional positions I, II, and III. Position I activates appropriate circuits when a single track microfilm is used, i.e., only one array of light detectors and associated networks are energized. Positions II and III activate both light detector arrays, but are the inverse of each other, so as to accommodate microfilm formats in which the numbers assigned to consecutive frames increases either to the left or the right. Except for the above optional position controls, the automatic operation of the apparatus is essentially the same as that disclosed in the cross-referenced patent.

The present invention provides an improvement over that disclosed in the cross-reference patent in that microfilm webs containing two parallel tracks of image frames may now be automatically positioned. Thus, after the digital number of a desired image frame is selected by operation of an input keyboard, and a "run" key is depressed, the apparatus automatically advances the web to position the selected image frame in the viewing station and to automatically center the located image frame within the station. However, if the desired frame is not located on the track then being scanned, the apparatus upon reaching the end of a microfilm web automatically reverses the direction of travel and shifts a transverse motion carriage transversely with respect to the transport path to scan and position image frames on the opposite track on the web. Optionally, if the operator is aware that the desired image frame is located on the opposite track of the film, he may cause the transport assembly to be moved transversely with respect to the transport path such that image frames within the opposite track are then within the optical path at the viewing station. Upon so doing, the count of position markers held within a memory unit becomes incorrect. An additional input to indicate a correct count of position markers is thus desirably provided.

As shown in FIG. 1, the viewing station includes a light detector assembly 900, which assembly includes two arrays of light detectors, each array being positioned adjacent opposite edges of a microfilm within the transport path. The assembly 900 includes a housing 902a and 902b having two elongated portions 904 and 906 respectively. At the end of each of the portions, a triple photocell array, 908 and 910 respectively, is positioned. Each array is preferably formed of a single monolithic semiconducting block having one common electrode and three transparent electrodes and is mounted such that the transparent electrodes are facing a microfilm web to be transported therebelow such that light transmitted through the web selectively falls on the transparent electrodes. An insulated arm 906 supports the members.

A cross-sectional view along the lines 2—2 is shown in FIG. 2, wherein the transparent electrodes 912 on one side of a monolithic semiconductive block 914 and the common opposite electrode 916 are shown positioned adjacent a cross section of a microfilm 918 having an opaque section forming a position marker 920 therein.

To solve the problems resulting from the use of fixed reference levels with the dual photocell assembly disclosed in the cross-referenced patent, the third photocell within each of the arrays 908 and 910 provides a continuous reference signal. The output of the two other cells is continuously compared with the output of the reference cell for an absolute determination of the presence of a position marker. The effective output from each of the cells is intentionally adjusted so that a given optical density contrast ratio is required before a change in light levels is electrically sensed to indicate a position marker. The specific circuitry for accomplishing such a comparison is disclosed in detail hereinafter.

The combination of FIGS. 3A and 3B is a schematic diagram, partially in block diagram form, of a preferred embodiment of the film handling apparatus of the present invention. The microfilm supporting and projection mechanism 55 is shown schematically in FIG. 3B and is substantially the same as that shown in the cross-referenced patent, with the exception that the film transport assembly, including the supply and takeup reels 338 and 303 respectively, the spindles 286 and 287, the drive motors 334 and 335, transport path controlling capstans (not shown) and related sensing members, are mounted on a transverse motion carriage 992 to enable the entire film transport assembly to be moved transverse to the transport path.

The transverse motion carriage 922 is coupled to a transverse motor 924 which is driven by the transverse motor control network 926 to controllably position one or the other of the parallel microfilm tracks within the optical path formed by the light source 11, lens 12 and viewing screen 16. The microfilm handling mechanism 55 is further provided with an end-of-film sensor 928 and with transverse motion limit switches 930 and 932 respectively. Preferably, dual track microfilm webs are provided with reflective markers or other optically distinguishable indications of the end of the microfilm webs such that the end-of-film sensor 928 produces a signal on lead 830 when the end of a film is present, such that the film may be stopped, the direction of film reversed and the transverse position of the carriage 922 with respect to the optical path shifted. The transverse limit switches 930 and 932 are positioned adjacent a projection 934 on the transverse motion carriage 922 such that one or the other of the switches is energized to provide a signal indicative of the position of the transverse carriage assembly 922.

The control system or microfilm web position regulation network for effecting automatic positioning of microfilm webs in response to input instructions is included within a position signal conditioning network 50, a memory reset network 51, a digital input and comparison network 52, and a motion control network 53. The actual transport speed and direction of the microfilm web are sensed by a tachometer 327 which provides a web motion signal on a lead 326. The comparing means, node 295, compares the control signal on lead 321 and the web motion signal on lead 326. The D.C. amplifier 325 amplifies the resultant of these two signals to provide the error signal on lead 328 indicative of the difference between the two compared signals. The error signal is fed through a motion enable circuit 329 to the center tap 725 of a non-linear voltage divider network 347 included within a power supply system 330. The power supply system 330 is coupled to the drive motors 334 and 335 through D.C. current amplifiers 331 and 332 respectively, to produce web motion in accordance with the error signal. The power supply system includes output terminals 345 and 346 where there are provided equal positive and negative electrical potential outputs with respect to ground. The non-linear voltage divider network 347 is electrically connected between the positive and negative electrical potential output terminals 345 and 346 and has two additional taps 282 and 283 which are located electrically equidistant from the center tap 725 for providing two controllable sources of power, the absolute potentials of the additional taps 282 and 283 being equal with respect to the center tap, but having opposite polarities with respect to the center tap 725. The additional taps 282 and 283 are thereby connected to track the error signal on the lead 328 and to increase and decrease in accordance with increases and decreases in the error signal. The supply reel drive motor 334 is electrically coupled between ground and the additional tap 282 and the takeup reel drive motor 335 is electrically coupled between ground and the other of the additional taps 283 to cause power to be differentially applied to each drive motor 334, 335 in accordance with the error signal.

Figure 5:
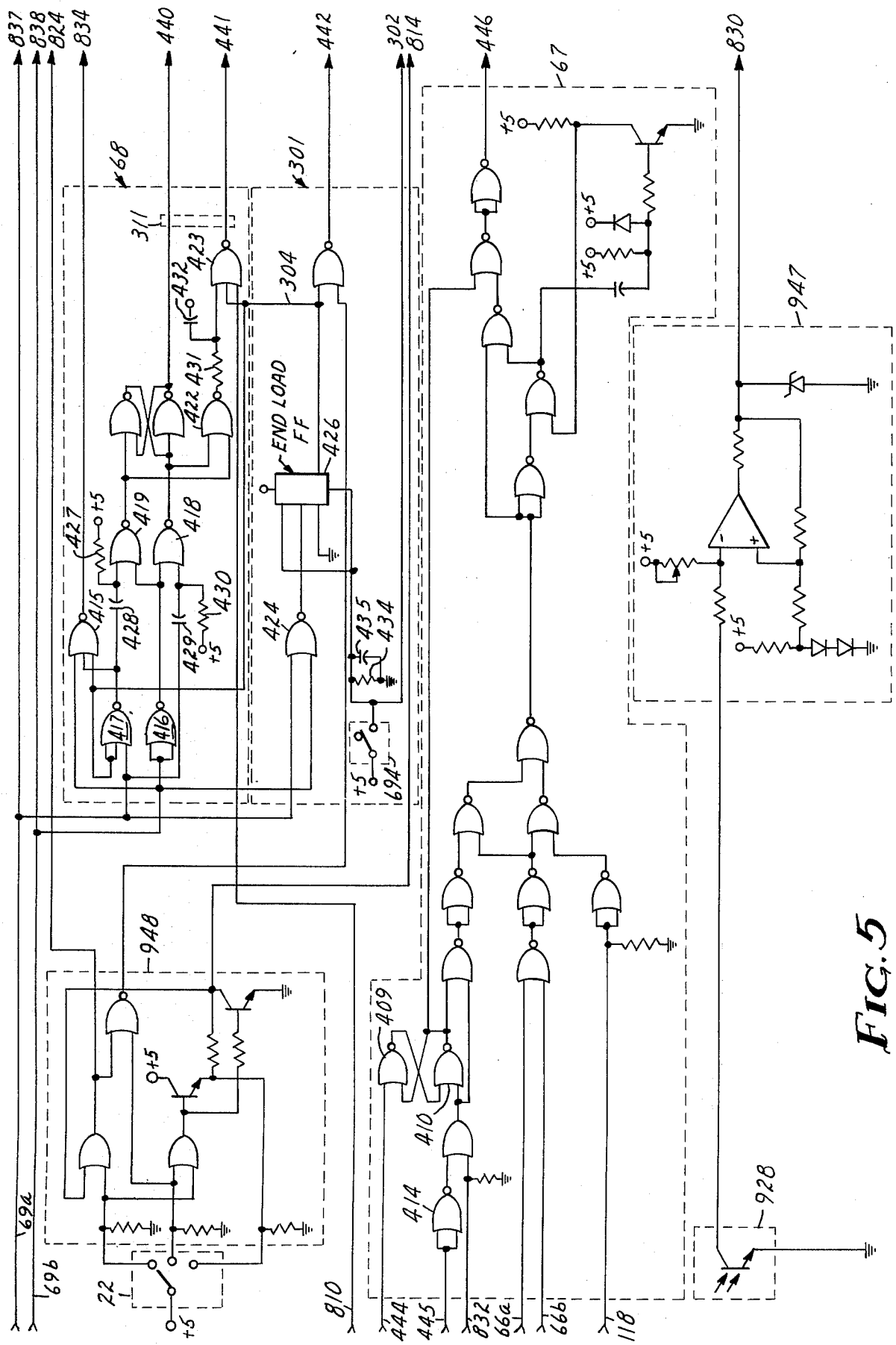

The position signal conditioning network 50 includes input terminals 56 and 57 to which signals provided from each of the photocell arrays 908 and 910 are coupled via leads shown symbolically as 291 and 292 from each of the arrays. The signals are coupled from the terminals 56 and 57 into a variable gain amplifer network 936 which allows the gain from the output of each of the photocells to be individually adjusted. The various outputs from the variable gain amplifier network 936 are coupled to two comparator networks 938a and 938b wherein the output from the left photocell in each array is compared with the reference signal produced by the reference photocell of that array and the right photocell in each array is similarly compared with the reference signal produced by the reference photocell of that array. The outputs from the comparator networks 938a and 938b are thereafter combined to provide a position signal for either a left or right photocell, regardless of the array from which the signals originated. The position signals are coupled through pulse shaper networks 940a and 940b and thence via leads 66a and 66b to the automatic centering network 67 and via leads 69a and 69b to the direction and pulse count network 68. The respective comparator networks 938a and 938b are selectively energized by "A" and "B" track position signals indicative of the transverse position of the carriage 922. Additional details of the position signal conditioning network 50 are shown in FIGS. 4 and 5.

Figure 6:
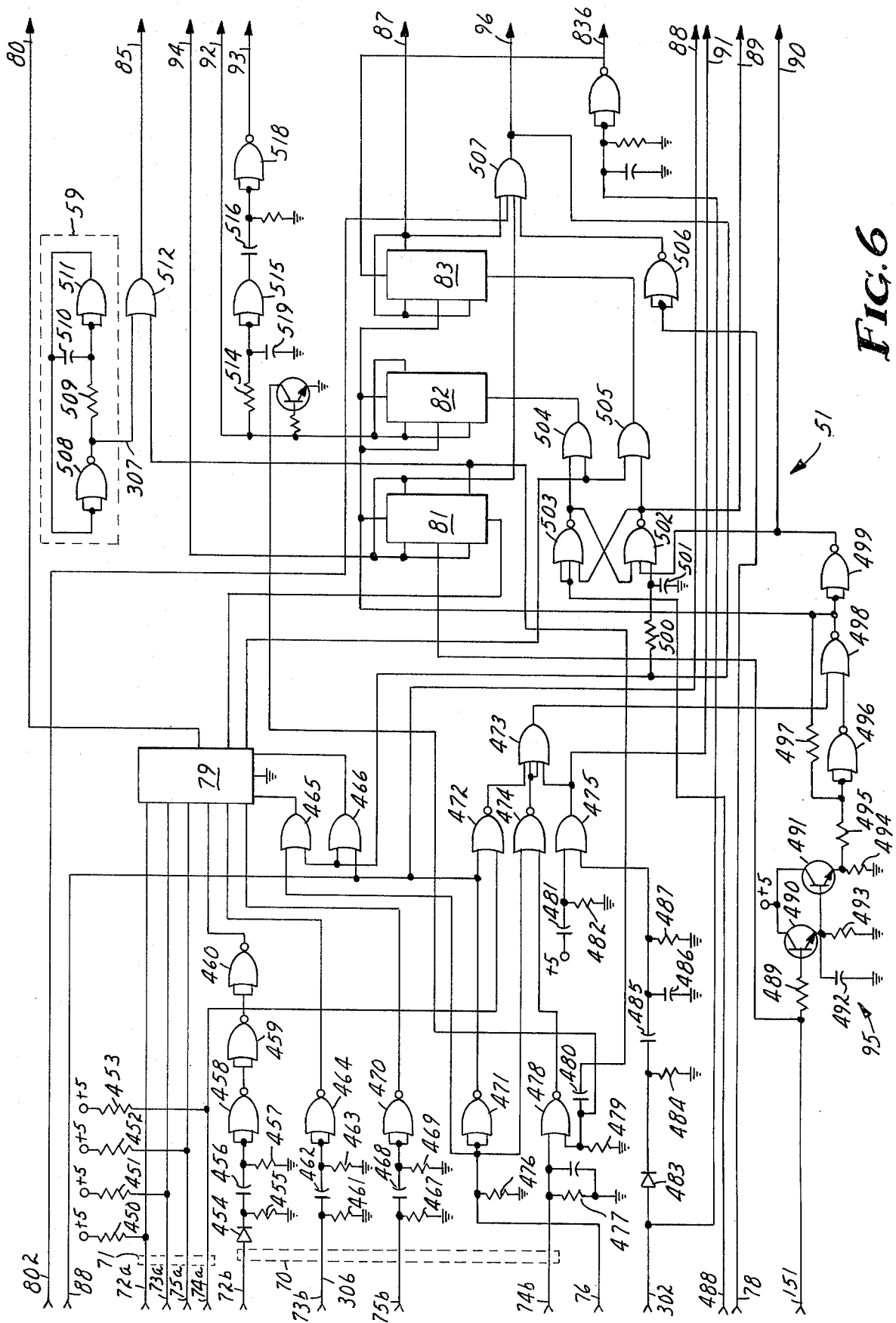
FIG. 6 is a schematic diagram of the memory reset network shown in FIG. 3A and identified therein by the reference numeral 51.

The memory reset network 51 which is shown in detail in FIG. 6 comprises a store circuit 58 and an oscillator circuit 59 interconnected to the store circuit 58 via lead 307. This network 51 is responsive to reset command signals from the reset key 27 via lead 306. The details of network 51 are shown in FIG. 5.

Figure 7:
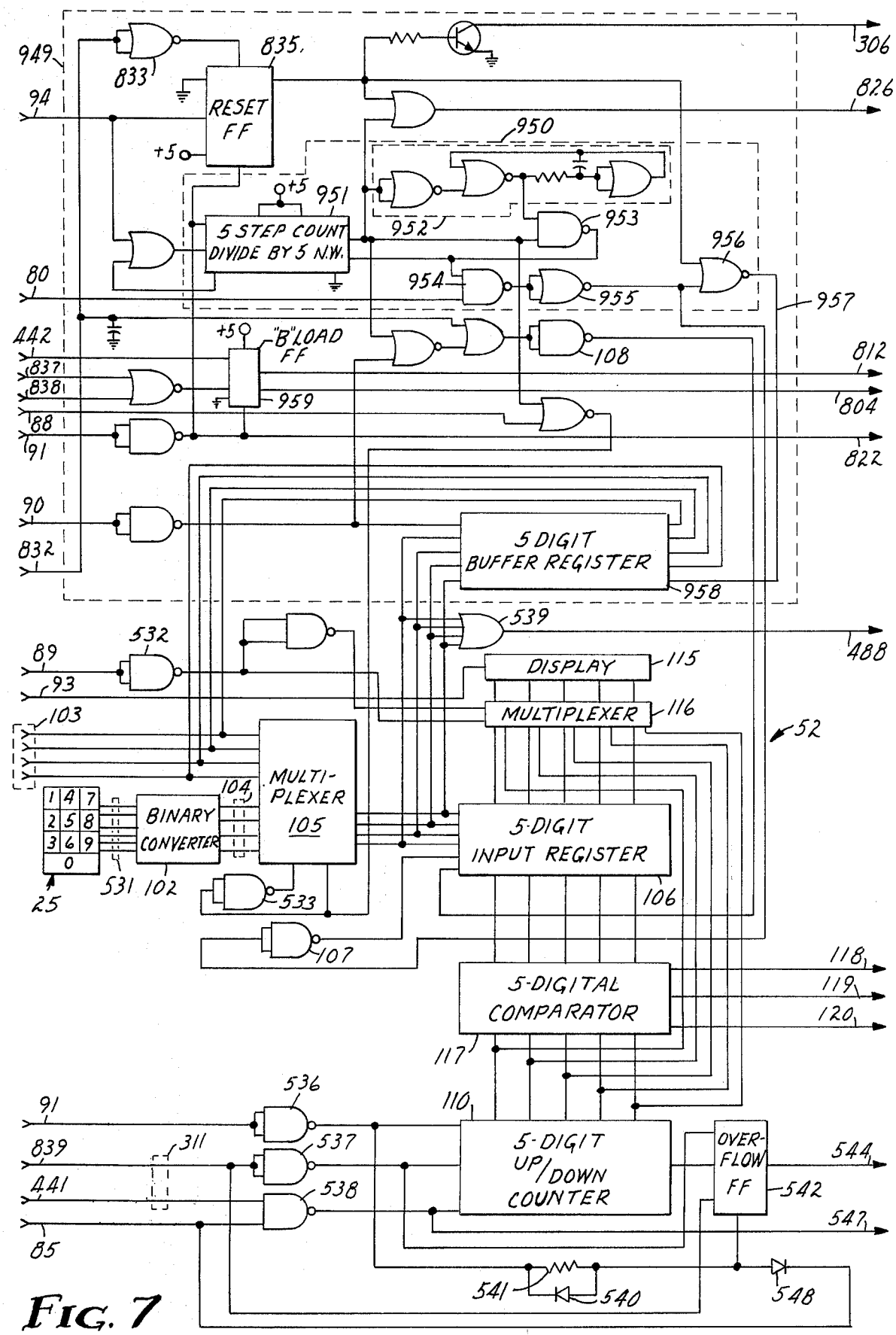
FIG. 7 is a schematic diagram of the digital input and comparison network shown in FIG. 3A and identified therein by the reference numeral 52.

The digital input and comparison network 52 which is shown in detail in FIG. 7, is shown in FIG. 3A to generally include the position and track control keyboard 25, a five-digit input shift register 106 coupled to the keyboard 25 via leads 308, 309 and 310, a five-digit up/down counter 110 connected to the direction and pulse count network 68 by the leads 311 and connected to the memory reset network 51 via lead 312, a five-digit, digital comparator network 117 connected to the five-digit up/down counter 110 via a lead 313 and to the five-digit input shift register 106 by lead 314, a five-digit buffer memory control network 949 and a display network 115 containing a five-digit display register 30 (See FIG. 2 of cross-referenced U.S. Pat. No. 3,802,771). The output signals from the direction and pulse count network 68 are applied to the five-digit up/down counter 110 on the leads 311 whereby a total count of the number of position markers is produced. Desired microfilm image frame positions are inserted by operating the frame selection keyboard 31 and digital signals indicative thereof are coupled to the five-digit input shift register 106 via the lead 308. The total count in the up/down counter 110 is compared with the number entered in the input shift register 106 by means of the digital comparator 117, the output of which is provided on a lead 293. A visual display of the count registered in counter 110 or of the number entered in the shift register 106 is provided by display service 115, which is coupled to the counter 110 via lead 315 and to the shift register 106 via lead 316. Optionally, digital signals indicative of desired image frame positions may be temporarily stored in the buffer memory control network 949, while updated count signals are fed into the up/down counter 110 via the reset input 27 and the memory reset network 51.

Figure 9:
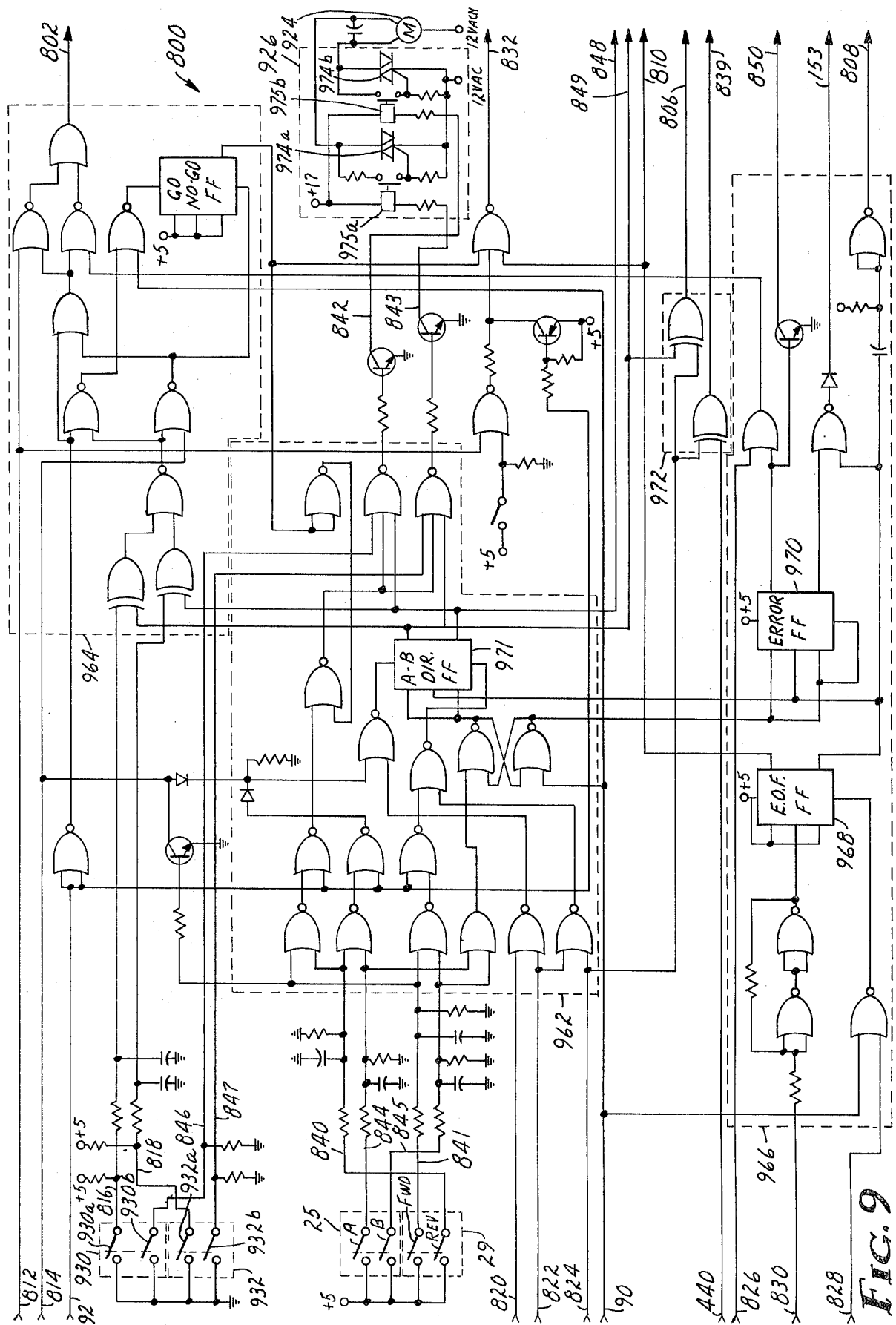
FIG. 9 is a schematic diagram of the transverse motion control network shown in FIG. 3B and identified therein by the reference numeral 800.

The motion control network 53 (FIG. 3B) is shown to generally include an automatic speed and direction control network 150, shown in detail in FIG. 8; a transverse motion control network 800, shown in detail in FIG. 9; a motion control logic network 180; a speed attenuation network 210; and a preconditioning network 250. The output signals from the digital comparator network 117 are coupled via lead 293 to the automatic speed and direction control network 150. Additional control signals are provided to the control network 150 from the store circuit 58 via lead 294. The signals from the comparator 117 on the lead 293 are indicative of whether the "blip" count representing the present microfilm position is greater, less than, or equal to the "blip" count representing the desired microfilm position. These signals are converted by the automatic speed and direction control network 150 into a set of direction and speed command signals, which in turn are coupled to the motion control logic network 180 via lead 317. The direction, speed and track control keyboard 29 provides for manual control of speed, direction and track position. Signals therefrom are also coupled to the motion control logic network 180 via lead 318 and to the transverse motion control network 800 for subsequent processing. The motion control logic network 180 operates to produce modified direction command signals on lead 320 and high, medium and low speed attenuator control signals on lead 319. Both types of signals are coupled to the speed attenuation network 210 via the leads 319 and 320, whereupon the direction signals from the motion control logic network 180 are selectively attenuated to produce a primary reference control signal on lead 321.

The preconditioning network 250 is controlled by the film sense signal on lead 302 produced by a film sense switch mechanism 694, and provides motion enabling signals on leads 288 and 289. The presence of a film sense signal also causes the production of load command signals on leads 290 and 322, the first of which actuates the automatic threading mechanism 323, via the automatic thread and film sense circuit 324.

The transverse motion control network 800 responds to signals on lead 830 from the EOF signal processing network 947 and provides transverse motion control signals to the transverse motor control network 926 causing it to drive the motor 924 to shift the position of the transverse motion carriage 922 and "A" or "B" track position signals on leads 848 and 849 to activate the appropriate comparator network 938a and 938b.

Referring to the transport driving network 54 (FIG. 3B), the motion enabling circuit 329 is energized by a motion enable signal from the motion control logic network 180 via lead 342. An additional signal from the motion control logic network 180 is coupled via lead 343 to the clamp enabling circuit 344 which, when energized, engages a film clamp mechanism (not shown) within the viewing station 340 so that the microfilm web is accurately positioned in the focal plane 13. The voltage divider network 347 comprises a four element series circuit connected between the power source terminals 345 and 346, having a pair of equal resistance resistors 348 and 349, and zener diodes 280 and 281.

Referring to the microfilm supporting and projection mechanism 55, the light source 11, optical system 12 and viewing screen 16 are shown schematically for projection of an image of an image frame along an optical path onto the screen 16. The automatic thread-up mechanism 323 includes as a drive out means, a driven member 341 which is actuated by the automatic thread-up circuit 324 in response to a signal on lead 321. Upon actuation, the member 341 is driven toward the hub of the supply reel 338 and forces a leading edge of the microfilm web out of the cartridge 23, through the transport path and onto the takeup reel 303, where it becomes engaged by subsequent layers of the web.

Detailed descriptions of the circuits and networks contained within the various sections discussed hereinabove are set forth in the following descriptions of the additional figures.

FIG. 4 sets forth in detail the circuits and logic networks utilized in conditioning the signals produced by the light detector arrays 908 and 910 respectively. The outputs of both arrays are conditioned in the following identical manner. In order that the signals produced by the arrays 908 and 910 be uniquely identified with the appearance of position markers on the microfilm regardless of the type microfilm or the relative intensity of the light source within the transport path, it is desirable that the base line and threshold condition required to produce a position signal be separately and continuously determined. This continuous comparison and determination is provided in a preferred embodiment of the present invention by the use of the comparator networks 938a and 938b.

To ensure that a change in the output from each of the photocells is associated with the presence of a position marker and is not merely the result of film contamination, it is desirable to individually adjust the outputs of each of the photocells within each array 908 and 910 prior to the comparison of the output of a position indicating photocell with the output of a reference photocell. Accordingly, the outputs of each photocell is coupled to the variable gain amplifier network 936. This network comprises six separate, variable gain amplifiers 942a, b, c, d, e, and f respectively each of which is connected to one of the photocells. Such amplifiers are preferably operational amplifiers, such as the Model N5558 dual operational amplifier manufactured by the Signetics Company, Sunnyvale, Calif. A variable feedback resistor 943a-f is connected between the output and one of the inputs to each of the amplifiers, and the other input to the amplifier is connected to the output of the photocells. Where photo voltaic cells are employed as the light detectors, it is further desirable to reverse bias the cells via appropriate bias potentials and biasing resistors causing the cells to function as photo diodes. It is preferable to adjust the amplitude of the signals produced by the respective amplifiers 942a-f such that a different level is produced when a position marker is affecting the output of a position indicating photocell than is produced when a position marker is affecting the output of a reference photocell. This variation in the gain in the respective amplifiers 942a-f is accomplished by varying the values of the respective feedback resistors 943a-f.

The outputs of the amplifiers 942a-f are coupled through a resistor-diode network 944a-f to the comparator networks 938a and 938b. Within each of the networks 938a and 938b, are two differential amplifiers 945a and 945b, and 946a and 946b respectively. Thus the photocells in the array 908 are coupled through the amplifiers 942a-c respectively such that an output from a left reading photocell is compared with the output from the reference photocell of that array in the differential amplifier 945a, and the output from a right reading photocell is compared with the output from the reference photocell of that array in the differential amplifier 945b. Similarly, the outputs from the photocell array 910 are coupled through the amplifiers 942d-f respectively, and are compared with the output from the reference photocell of that array via differential amplifiers 946a and 946b. The position signal outputs originating at the left reading photocells of each array are then coupled together and fed into a pulse shaping network 940a while the position signal outputs originating at the right reading photocells are coupled through a pulse shaping network 940b. The differential amplifiers 945a and 945b and 946a and 946b are respectively activated by a signal indicative of the transverse position of the carriage 922 via leads 848 and 849.

The pulse shaping networks 940a and 940b each comprise a series of conventional NOR and OR logic gates together with resistor and capacitive feedback loops to ensure that the position signals are switched in a uniform fashion regardless of the speed or direction of the movement of the microfilm web. The outputs from the pulse shaping networks 940a and b are provided through leads 69a and 69b to the direction and pulse counting network 68 and via leads 66a and 66b to the automatic centering network 67 via the NOR gate 406, which networks are shown in detail in FIG. 5. The network 67 ensures that the automatic centering function is only activated when certain prescribed conditions exist. Accordingly, a signal on lead 444 is provided to ensure that film motion is only allowed when film clamps (not shown) which hold the microfilm firmly within the focal plane in the viewing station 340 are released. Similarly, a signal on lead 445 is provided to enable automatic centering only in low speed conditions. Finally, a clear II signal is provided on lead 832 to enable automatic centering operations following a transverse movement of the carriage 922. These signals are processed through the logic gates 409, 410, 414 and other related logic gates within the automatic centering network 67 to provide the production of the automatic centering output signal on lead 446.

The direction and pulse count network 68 which is also shown in detail in FIG. 5, provides the basic "up/down" and "blip" count signals on leads 440 and 441 respectively, which signals are subsequently processed to accumulate a count of the number of image frames which have traversed the viewing station 340 and to control the subsequent direction of movement of the microfilm web. The network 68 recognizes the sequence of occurrence of pulses from the photocells via leads 69a and 69b and thereby provides an up/down signal on lead 440 indicative of the direction of travel of the microfilm. An additional input to the direction and pulse count network 68 is provided on lead 810 from the end-of-film signal comparing and modifying network 966 (see FIG. 9) to indicate the presence of the end of the film within the viewing station and thereby interrupt further blip count operations until the transverse motion carriage 922 has been repositioned. This signal results from a signal initiated by a photo detector 928 which is coupled to an EOF signal processing network 947 which provides an inverted output signal on lead 830. In addition, a signal is provided on lead 834 as an additional control signal to the automatic speed and direction control network 150.

A mutiple pole switch 22 located on the control panel provides additional output control signals on leads 814 and 824 to facilitate the use of various types of microfilm. Thus, when the switch 22 is in an off position, indicative of the use of microfilm not containing position markers, a signal is provided which is processed in the film type control network 948 to deactivate blip counting operations and automatic transverse motion. In Position I, a signal is produced by another contact within the switch 22 indicative of the presence of microfilm having a single track contained therein to thereby deactivate the second array of photo detectors. The occurrence of such a signal is prevented by a signal on lead 824 indicative of the positions II and III on the switch 22 and controls the forward or reverse direction of the microfilm with the appropriate set of detectors activated.

The film sense and first blip control network 301 is also controlled by inputs on leads 69a and 69b together with a signal from the film sensing switch 694 via the lead 302. The presence of a film within the takeup reel 303 causes the switch 694 to be opened, thereby providing a 5 volt signal to the end load flip-flop network 426, causing the flip-flop 426 to change states and provide an end of the load signal on lead 442, which in turn activates other networks. The other output of the flip-flop 426 is coupled to the direction and pulse count network 68 via lead 304 to enable the "blip count" signals to commence, thereby providing a means wherein an initial blip count produced by the leading edge of the microfilm is not counted as the occurrence of a position marker.

A signal is further provided on lead 302 to energize the store circuit 58 as hereinafter set forth.

FIG. 6 sets forth the detailed logic networks included within the memory reset network 51. These networks produce machine function commands in response to either local or remote input signals, and provide signals to reset the total count registered in the five-digit up/down counter 110 in response to appropriate inputs. FIG. 6 shows two general sets of input leads, 70 and 71, one set 70 from a machine keyboard 25 and one set 71 from a remote terminal respectively. Parallel inputs include clock driving signals on leads 72a and 72b to indicate the presence of valid signal inputs; "reset" signals on leads 73a and 73b to initiate the memory update function; "clear" signals on leads 74a and 74b to clear the input register, and "run" signals on leads 75a and 75b to initiate transport motion. Other inputs include a remote select signal on lead 76, the film sense signal on lead 302, a signal on lead 78, which is indicative of the presence of microfilm containing position markers, a search II signal on lead 802 indicative of a transverse requirement, a signal on lead 88 which allows remote data input, and a signal on lead 488 to initiate either search or rewind operations in response to keyboard input data.

Signals from the local and remote leads 70 and 71 are switched via a multiplexer 79, which is activated by a signal on the remote lead 76. The outputs from the multiplexer 79 provide a shift register signal on a lead 80 and input signals to store, search and rewind flip-flop circuits 81, 82 and 83 respectively. One output lead of the store flip-flop 81 is combined with the output lead 307 of a local oscillator 59 to provide a store count output signal on a lead 85, which enables a number provided by the position control keyboard 25 to be transferred to the up/down counter 110 while the other output of the flip-flop 81 provides a store signal on lead 94. The search and rewind flip-flop circuits 82 and 83 are selectively activated by keyboard position command signals registered prior to initiation of a "run" command signal on lead 73a, 73b. In the event a position command signal has been registered, the search flip-flop circuit 82 provides an output signal to enable the automatic direction and motion control circuit 150 to initiate web transport motion. In an opposite state, the search flip-flop 82 provides a search signal on lead 92 and, a past display signal on lead 93. In the event no position command signal has been received, the rewind flip-flop 83 provides an output signal on lead 87 to enable high speed reverse web transport motion. Also shown as output signals on FIG. 6, are a key data flip-flop signal on lead 89, which activates the display multiplexer 116, clear signals on lead 90 and power clear signals on lead 91, which clear the five-digit input shift register 106 and the five-digit up/down counter 110, respectively, a print ready signal on lead 96 to enable a print function or to provide for future remote interface, and an inverted film sense signal on lead 836. A second display (not shown) may be provided which when enabled by the past display signal on lead 93 will record the frame number viewed prior to the last search initiation.

FIG. 7 sets forth the functional circuits included in the digital input and comparison network 52, by which information indicative of a desired web position or image frame is compared with information indicative of the actual web position to provide transport motion signals. The desired position signals are coupled via leads 531 provided from a ten-position keyboard switch 25 to a binary encoder 102 which translates the signals into a four-bit binary number. Similar information may be received from remote inputs via leads 103 from a remotely located control panel (not shown). Selection between the remote inputs on leads 103 and the local inputs on leads 104 is provided by a multiplexer switch 105. The outputs of the multiplexer 105 are applied to a five-digit input register 106 which is controlled by shift and clear signals on leads 80 and 90 respectively, also supplied from the memory reset network 51 (FIG. 6) through NOR gates 107 and 108. The five-digit input register 106 comprises a bank of five four-bit registers (not shown) coupled to form a parallel shift register. In a preferred embodiment each four-bit register may, for example, be a register such as that produced by Texas Instruments, Inc. part No. SN 74175.

The outputs from the multiplexer 105 are also coupled to a buffer memory control network 949, which comprises a five-digit buffer register 958 and associated logic circuits for controlling the input of search information from the multiplexer 105 through the five-digit buffer register 958 and back to the multiplexer 105 under conditions where it is necessary to temporarily store such information pending updating the reference information held in the five-digit up/down counter 110.

Upon input of search information from the keyboard 25 through the multiplexer 105, the information is fed in parallel into both the five-digit input register 106 and the five-digit buffer register 958. If a track address is given which is different than the present position of the microfilm web, a clear II signal is generated on lead 832 which is coupled through a NOR gate 833 to the reset flip-flop 835. At this time the operator must update the data held in the five-digit up/down counter 110. This is done by reinserting reference information on the keyboard 25, which information is coupled through the multiplexer 105 into the five-digit input register 106. Depression of the reset switch 27 (see FIG. 3A) produces a reset signal on lead 306, whic via the multiplexer 79 (see FIG. 6) results in the store signal 94 to in turn switch the reset flip-flop 835. This in turn causes the newly inserted information to be coupled to the five-digit up/down counter 110, and activates the five-step counter network 950.

The five-step counter network 950 includes a five-step "divide by 5" network 951, an oscillator shown generally as 952, NAND gates 953 and 954, and NOR gates 955 and 956. Upon the occurrence of a store signal on lead 94 and a shift signal on lead 80, the five-step counter network is activated and produces 5 shift pulses at the output of the NOR gate 956 which are coupled via lead 957 to the five-digit buffer register 958 to shift the information held in the buffer register back into the five-digit input register 106 whereupon comparison of the newly entered reference information with the previously stored search information may be continued. Additional inputs to the buffer memory control network 949 include an end of load signal on lead 442 and left photo and right photo position signals on leads 837 and 838 respectively. These signals are coupled to a "B" load flip-flop 959, the output of which appears on lead 812 and provides a signal to invert the position signal counting sequence when the "B" track is positioned within the viewing station. Additional signals facilitating remote operation are provided on lead 88 and a power clear signal provided on lead 91 from the memory reset network 51, which signal further provides an inverted output signal on lead 822.

Accordingly, an indication of actual web position, e.g., the specific image frame located within the viewing station at any given time is provided by a five-digit up/down counter 110, which counts and converts input pulses into four-bit binary encoded numbers. The input signals are entered either as blip count signals on leads 441, indicative of actual web locations or as store count signals on lead 85 produced by the reset function in the memory reset network 51. An up/down signal on lead 839 triggers the five-digit up/down counter 110 in the direction in which the counting is to proceed. A power clear signal on lead 91 is provided to clear the up/down counter upon either initial energization of the apparatus or upon completion of a rewind function. Signals indicative of the counts recorded in the five-digit up/down counter 110 and in the five-digit input register 106 are coupled to a display register 115 through a multiplexing unit 116 driven by the key data flip-flop signal on lead 89 from the memory reset network 51. The display registers 115 may be of any conventional type such as light emmitting diode displays produced by Hewlett-Packard, model number 7300. The outputs of the five-digit up/down counter 110 and the five-digit input register 106 are also applied to a five-digit digital comparator 117 which provides three output signals, "equal to"

on lead 118, "greater than" on lead 119, and "less than" on lead 120, in response to a comparison between the output from the registers 106 and 110. The "equal to", "greater than" and "less than" signals provide basic signal inputs to the motion control network 53. The inputs to the up/down counter 110 are also coupled to flip-flop 542, to provide additional control signals on leads 544 and 547.

The motion control network 53 (FIG. 3B) comprises the networks and circuits shown in FIGS. 8 and 9 and in FIGS. 10 and 11 of the cross-referenced patent. FIG. 8 shows the automatic speed and direction control network 150. The "greater than" signal on leads 119 and the "less than" signal on lead 120 from the digital comparator 117 together with an overflow signal on lead 544 and a track position signal on lead 806 which inverts signals received from the "A" and "B" tracks, are coupled to a multiplexer 960, to produce either a reverse command signal or a forward command signal which are coupled through the NOR gates 561 and 563 to the film direction flip-flop 159.

The "equal to" signal on lead 118, provides a stop command signal to NOR gates 565 and 566. The respective signals are combined in a direction control network 165 together with a search II command signal on lead 802, a rewind command signal on lead 87, a store signal on lead 94, an end of film go signal on lead 808, a count signal on lead 547, film motion signals on lead 834 and an EOF/FF signal on lead 810 to provide direction control signals on leads 152 and an EOF inhibit signal on lead 828.

An "equals" output is provided on a lead 151 from NOR gate 577 whenever the "equal to" signal on lead 118 appears, and causes a speed control network 160 to change states upon each loss of the "equal to" signal, at the same time causing selective NOR gates 566 and 575 to change states, thereby sequentially producing opposite direction, and slower speed signals on leads 152. Lead 153 provides a reverse low speed command signal. Lead 154 provides a reverse medium speed command signal. Lead 155 provides a reverse high speed command signal. Lead 156 provides a forward high speed command signal. Lead 157 provides a forward medium speed command signal. Lead 158 provides a forward low speed command signal.

The automatic speed and direction control network 150 (FIG. 8) becomes activated upon initiation of a search function. Such an initiation causes the digital comparator 117 (FIG. 7) to compare the desired position entered on the input register 106 with the present position, entered in the counter register 110, and to produce an initial direction command depending upon whether the count in the input register 106 is greater or less than the count in the counter register 110. The initial direction command signals may be either a forward, reverse, or equals, i.e., stop command signals, each of which appear on leads 120, 119 or 118 respectively from the digital comparator 117 to the automatic speed and direction control network 150. Assuming, for purposes of illustration, that a forward command signal on lead 120 is produced initially, it would enable the speed control network 160 to provide a high speed forward output signal on lead 156, enabling web motion until a stop command signal is received on lead 118, as the result of the change in position, which also results in a change in the total count in the input register 106 such that the counts become equal. Upon receipt of a first stop command signal on lead 118, the speed control network 160 is switched, thereby producing a lower speed signal, and a direction control flip-flop 159 is switched to activate an opposite direction signal. Thus a reverse medium speed signal would be produced on lead 154, causing reverse motion to continue until a second stop command signal is received, at which point the transport direction is again reversed and the speed control network 160 switches to a third or low speed state thereby providing a forward low speed command signal on lead 158. Receipt of a third stop command signal, while in a low speed state, causes film motion to stop, as no over-ride will occur. The "equal" signal 151 is also coupled back to the memory reset network 51 where it is coupled through a time discriminator network 95 (FIG. 6), thereby activating the clear circuits only after the equal condition persists for a predetermined length of time indicative that the search has been completed.

FIG. 9 sets forth the detailed logic network included within the transverse motion control network 800 which forms a portion of the motion control network 53 shown in FIG. 3B. The transverse motion control network 800 responds to both manual input signals and to automatic search command signals to produce motor drive signals which are coupled to the transverse motor control network 926, thereby driving the transverse motor 924. Manual inputs to provide transverse carriage motion are provided via the forward transverse and reverse transverse switches which are a portion of the direction, speed and track control keyboard 29. Upon the closing of the reverse transverse switch, a reverse transverse signal is produced on lead 840 while a forward transverse signal is produced on lead 841 upon the closing of the forward transverse switch. These signals continue for so long as either of the switches is continuously closed. These signals are coupled through a motion control multiplexing network shown collectively as 962 to provide a reverse transverse output signal on lead 842 and a forward transverse output signal on lead 843. The capability of providing continuous transverse carriage motion is desired inasmuch as the transverse location of position markers on double track and on single track microfilm is not necessarily the same for all types of microfilm. Accordingly, it is particularly desirable to be able to continuously position the transverse motion carriage 922 with respect to the optical path within the viewing station 340. Alternatively, additional manual input controls are provided via the "A" and "B" track positioning controls forming a portion of the position direction and track control keyboard 25. In response to a momentary closing of either of these controls, a signal is produced on the "A" track input lead 844 or on the "B" track input lead 845, which signals are coupled to the motion control multiplexing network 962. The presence of signals on leads 844 and 845 results in the production of either reverse transverse or forward transverse output signals on leads 842 and 843 respectively, which signals then persist until terminated as a result of the transverse motion carriage 922 activating transverse position switches 930a and 923a.

The closing of the transverse position switches 930a or 932a produces either an "A" position signal on lead 816 or a "B" position signal on lead 818, which signals are coupled to the transverse motion inhibit network 964. Additional inputs to this network include a search signal on lead 92 which controls the initiation of film transport motion, a position I input on lead 814 which disables all transverse carriage motion, a "B" load signal on lead 812 which temporarily interrupts film transport during transverse carriage motions in the event it is desired to load the film and for the search to start on the "B" track, and a search II inhibit signal on 826. Logic gates contained within the transverse motion inhibit network 964 produce a second search signal on output lead 802 in response to these input signals to thereby inhibit film motion during transverse carriage motion. Additional transverse limit signals produced from switches 930b and 932b are provided on leads 846 and 847, which signals are coupled to the motion control multiplexing network 962 to terminate the transverse motion control signals such as occur on leads 842 and 843. Additional input signals to the motion control multiplexing network 962 include a position III signal on lead 820, an inverted power clear signal on lead 822, a combined position I and II signal on lead 824, and a clear signal on lead 90. In addition to the forward and reverse transverse output signals on leads 842 and 843, the motion control multiplexing network 962 further provides a clear II signal on lead 832 to initiate a data reset or update requirement, and "A" and "B" position signals on leads 848 and 849 respectively, which signals are coupled to the comparator networks 938a and 938b to activate either the "A" or "B" track comparators.

The forward and reverse transverse output on leads 842 and 843 are coupled to the transverse motor control network 926. This network includes a pair of solid state switches 974a and 974b, which are preferably triacs such as Model 40721 manufactured by RCA Inc. The output of each of the switches 974a and 974b is coupled to forward and reverse rotation terminals of the transverse motor 924. The gates of each of the triacs are controlled by a magnetically operated reed switch 975a and b respectively which are closed in response to a signal on lead 842 or 843.

The transverse motion control network 800 further includes and end-of-film signal comparing and modifying network 966. A signal on lead 830 produced by the end-of-film sensor 928 together with an end-of-film inhibit signal on lead 828 are coupled to an end-of-film flip-flop 968, the output of which is further coupled to produce the clear II signal 832 and which is further coupled via output lead 810 to the direction and pulse count network 68 (FIG. 5) and to the direction control network 165 (FIG. 8). Additional outputs from the end-of-film flip-flop 968 are provided to the error flip-flop 970 and to the transverse direction flip-flop 971 and, via lead 808, to produce an end-of-film "go" signal which is coupled to the film direction flip-flop 159 to reverse the direction of the film in response to the occurrence of a desired position marker occurring at the end of the film. The output of the end-of-film flip-flop 968 is also combined with the error flip-flop 970 to provide an output signal on lead 153 to activate the film transport in a reverse low speed mode. Additional outputs from the error flip-flop 970 are coupled to the control panel via lead 850 to energize and indicator located thereon to indicate the absence of a position location consistent with the input instructions and are also coupled to the transverse position network 964 to control the production of the search II signal on lead 802. The production of this search signal is further controlled by the clear signal on lead 90.

The direction of counting position markers is further controlled by a track and count inversion network 972, which is controlled via the position I and II signal on lead 824, by the signal from the up/down flip-flop on lead 440 and by an output signal from the transverse direction flip-flop 971. These signals are combined via exclusive OR gates to provide the row position signal on lead 806 and an inverted up/down signal on lead 839.

The motion control network 180 (FIG. 3B) is shown in detail in FIG. 10 of the cross-referenced patent and responds to either of the two sets of input signals shown generally as leads 152. The specific circuits and networks for producing the desired transport speed command signals are discussed in that patent in conjunction with FIG. 10 thereof. Similarly, the speed attenuation network 210 is discussed in detail in conjunction with the discussion of FIG. 11 of the cross-referenced patent, the preconditioning network 250 is discussed in conjunction with FIG. 12 of the cross-referenced patent, and the transport driving network 54 is discussed in detail in conjunction with FIGS. 13, 14 and 15 of that patent. The same circuits are used with the apparatus of the present invention and hence no further discussion thereof is required.

Components used in the preferred embodiment described in conjunction with FIGS. 4-8 are conventional logic components such as OR, NOR, NAND or similar elements such as are indicated by the standardized symbols in the drawing. While multi-unit integrated circuit logic units may be preferably employed, discrete components, wired circuits, etc., performing the same function indicated by the standardized symbols, are intended to be equivalent. Accordingly, where OR gates are shown, Signetics Company units SP 374 and 384 are preferred, where NOR gates are shown, Signetics Company units SP 370 or 380 are preferred, and where NAND gates are shown, Signetics Company units SP 377 or 387 are preferred. Similarly, integrated circuit flip-flops SP 321 and SP 322B, manufactured by the Signetics Company, are preferably used in the various flip-flop networks disclosed herein, Quad-2 multiplexers, Model N 8266B manufactured by Signetics Company are preferably used where multiplexer circuits are discussed, and Model 7481 exclusive OR gates manufactured by Motorola, Inc., where those devices are set forth. The associated discrete components shown in the drawing are of conventional values and are readily determined by one of ordinary skill in the art.

What is claimed is:

1. In a microfilm handling apparatus for controlling motion of microfilm webs having two parallel tracks of image frames, one track adjacent each edge of the web to position an image frame of said microfilm web in a viewing station, wherein said microfilm web contains optically detectable position markers corresponding to the image frames of each of said two parallel tracks, said apparatus comprising:
   a. means for controllably driving said web in a given direction of travel along a transport path:
   b. light detection means for optically detecting said position markers, such that a position signal is produced when a position marker is adjacent said light detection means; and
   c. web position regulation means controlled by said position signal for stopping the driving means when a said position marker is positioned adjacent said light detection means,
   the improvement wherein said light detection means comprises two sets of light detectors, a first set for optically detecting position markers corresponding to image frames of a track adjacent one edge of the web and the other set for optically detecting position markers corresponding to image frames of the other track adjacent the opposite edge of the web, each of said sets of light detectors comprising at least three light detectors, two of which are abutting each other and have an effecting sensing diameter at said focal plane which is not greater than one-half the dimension of a position marker parallel to the direction of motion of the web such that two separate detected signals are produced when a position marker is detected, and a third detector for producing a light level reference signal, wherein said web position regulation means further comprises a position signal conditioning network means coupled to the outputs of said detectors of each set detectors for comparing a said light level reference signal and a said detected signal and for producing a position signal only when the difference between said reference signal and said detected signal exceeds a predetermined value to thereby automatically adjust the threshold sensitivity level at which a position signal is produced, and wherein means are provided for sensing the final image frame of one of said two parellel tracks at one end of the web and for providing and end-of-web signal thereupon, means for reversing the direction of travel of said web in response to said end-of-web signal and transverse drive means for shifting the microfilm web transversely with respect to the transport path in response to a said end-of-web signal whereby image frames of either of said two tracks may be positioned in said viewing station.

2. An apparatus according to claim 1, wherein said position signal conditioning network further comprises variable gain amplifiers coupled to each of said light detectors such that the output of each light detector and amplifier combination may be adjusted to provide optical density selectivity and wherein the outputs from the respective comparing means associated with both light detection means are coupled to provide a single set of compensated position signals.

3. A microfilm handling apparatus for controlling motion of microfilm webs to position an image frame of said microframe web in a viewing station, wherein said microfilm web contains optically detectable position markers corresponding to the image frames, said apparatus comprising:

a. means for positioning and supporting said web in a transport path;

b. driving means for controllably driving said web along said transport path;

c. viewing station means along said transport path through which light is directed and including a focal plane at which an image frame of said web may be positioned for projection by an optical system;

d. light detection means comprising at least one light detector positioned within the viewing station means adjacent said focal plane for optically detecting said position markers, such that a position signal is produced when a position marker is adjacent a light detector; and e. web position regulation means controlled by said position signals which when enabled stops the driving means when a said position marker is positioned over a light detector whereby an image frame is positioned in the viewing station for projection of an image from said frame, the improvement wherein said light detection means comprises an array of three light detectors positioned along a line parallel to said direction of travel, the center detector in said array abutting the other detectors, each light detector having an effective sensing diameter at said focal plane which is not greater than one-half the dimension of a position marker parallel to the direction of travel of said web such that two separate signals are detected by two abutting light detectors and a said light level reference signal is produced by the third light detector when a said position marker is positioned over one of two abutting light detectors and not over the other, and wherein said web position regulation means further comprises a position signal conditioning network means for comparing said light level reference signal with a detected signal from at least one of the other light detetors and for producing a position signal only when the difference between said reference signal and said detected signal exceeds a predetermined value to thereby automatically adjust the threshold sensitivity level at which a position signal is produced, and an automatic centering means for comparing said two position signals and which when enabled produces an automatic centering signal for stopping the driving means when said comparison indicates that a first edge of a said position marker is positioned between said two abutting light detectors, whereby an image frame is centered in the viewing station.

4. An apparatus according to claim 3 wherein sid light detection means comprises an integrated array of three photo diodes formed of a homogeneous slab of a photoconducting semiconductor, a common contact on one side of said slab and three discrete transparent contacts positioned along a line on a side of said homogeneous slab opposite that of the common contact.

5. A microfilm handling apparatus for controlling motion of microfilm webs to position an image frame of said microfilm web in a viewing station, wherein said microfilm web contains optically detectable position markers corresponding to the image frames, said apparatus comprising:

a. means for positioning and supporting said web in a transport path;

b. driving means for controllably driving said web in a given direction of travel along said transport path;

c. viewing station means along said transport path through which light is directed and including a focal plane at which an image frame of said web may be positioned for projection of an optical system;

d. light detection means comprising at least one light detector positioned within the viewing station means adjacent said focal plane for optically detecting said position markers, such that a position signal is produced when a position marker is adjacnt a light detector; and e. web position regulation means controlled by said position signals which when enabled stops the driving means when a said position marker is positioned over a light detector, the improvement wherein said light detection means includes another light detector for producing a light level reference signal when a said position marker is not positioned over said another light detector, all said light detectors being positioned along a line parallel to said direction of travel, said web position regulation means further comprises a position signal conditioning network means for comparing said light level reference signal with a detected signal from said at least one light detector and for producing a position signal only when the difference between said reference signal and said detected signal exceeds a predetermined value to thereby automatically adjust the threshold sensitivity level at which a position signal is produced, control means for providing a control signal corresponding to web position and to a desired web transport speed and direction of travel, sensing means for sensing actual web speed and direction, for providing a web motion signal which varies in accordance with web speed and direction of travel, for detecting the final image at one end of said web and for providing an end-of-web signal thereupon, comparing means coupled to the control means and to the sensing means for receiving said control signal and said web motion signal, and for providing an error signal indicative of the difference therebetween and power supply means controlled by said error signal and electrically connected to the driving means for producing web motion in accordance with said error signal, whereby the speed and direction of said web is controlled to position an image frame at the viewing station for projection of an image from said frame, and wherein the apparatus further comprises means coupled to said driving means for reversing the direction of travel of said web in response to a said end-of-web signal and transverse drive means coupled to said sensing means for shifting the microfilm web transversely with respect to the transport path in response to a said end-of-web signal, whereby microfilm webs having parallel tracks of consecutive image frames may be automatically and controllably positioned to thereby position a given image frame on either track in said viewing station.

6. An apparatus according to claim 5, further comprising means responsive to a manual input signal for causing said transverse web movement and wherein said control means further comprises means responsive to an input reference signal for redetermining the position of said web following a said transverse web movement to thereby provide a corrected control signal.

7. A microfilm handling apparatus for controlling motion of microfilm webs to position an image frame of said microfilm web in a viewing station, said apparatus comprising:

a. means for positioning and supporting said web in a transport path;

b. driving means for controllably driving said web in a given direction of travel along said transport path;

c. viewing station means along said transport path through which light is directed and including a focal plane at which an image frame of said web may be positioned for projection by an optical system;

d. control means for providing a control signal corresponding to web position and to a desired web transport speed and direction of travel;

e. sensing means for sensing actual web speed and direction and for providing a web motion signal which varies in accordance with web position, speed and direction of travel;

f. comparing means coupled to the control means and to the sensing means for sensing the difference between said control signal and said web motion signal, and for providing an error signal indicative of said difference; and g. power supply means controlled by said error signal and electrically connected to the driving means to produce web motion in accordance with said error signal, whereby the speed and direction of said web is controlled to position an image frame at the viewing station;

wherein the sensing mens further comprises means for detecting the final image frame at one end of said web and for providing an end-of-web signal, and wherein said apparatus further comprises means coupled to said driving means for reversing the direction of travel of said web in response to a said end-of-web signal and transverse drive means coupled to said sensing means for shifting the microfilm web transversely with respect to the transport path in response to a said end-of-web signal, whereby microfilm webs having parallel tracks of consecutive image frames may be automatically and controllably positioned to thereby position a given image frame on either track in said viewing station.

8. An apparatus according to claim 7, further comprising means responsive to a manual input signal for causing said transverse web movement and wherein said control means further comprises means responsive to an input reference signal for redetermining the position of said web following a said transverse web movement to thereby provide a corrected control signal.

* * * * *